Patented Apr. 12, 1938

2,114,195

UNITED STATES PATENT OFFICE 2,114,195

FROZEN EGG PRODUCT AND METHOD OF MAKING

Harry Teichner, Chicago, Ill.

No Drawing. Application June 9, 1937,
Serial No. 147,387

5 Claims. (Cl. 99—196)

This invention relates to a frozen egg product and method of making the same.

Eggs may be preserved in several well known ways. One common way of preserving eggs is to mix the yolks and whites with large amounts of sugar or sugar syrup to form a preserved mixture. This method is objectionable because such a large quantity of carbohydrate must be added and the mixture must be made very sweet to properly preserve the eggs that the resulting product is unsuitable for many purposes.

Another common method for preserving eggs is to dry the eggs and then subject them to freezing temperatures. However, the drying of the eggs destroys certain desirable properties of the raw eggs, so this method is not very satisfactory.

Yet another method commonly practiced is to mix sugar with the whites and yolks of eggs and then freeze this mixture. Though somewhat satisfactory this method is attended with the disadvantage that the resulting product, after thawing, has a tendency to stratify and form a pool of watery material over the heavier yellow body. Not only is it difficult for the baker or manufacturer to obtain a uniform quantity of the mixture for use in his batch, but this stratification is objectionable in the foods in which the eggs are used. For example, mayonnaise made from eggs preserved by the use of sugar and freezing, if left standing on the merchant's shelf for a prolonged period of time, will tend to separate into a watery mass and a more solid material. This characteristic of mayonnaise is very objectionable and renders the product less salable. Also, baked goods, cakes and cookies made with eggs preserved through the use of sugar and freezing, due to this tendency of the semi-transparent fluid to separate out from the remainder of the product, tend to lose their moisture sooner, the liquid of the mixture being held less tightly and being more readily released through evaporation.

Both sugar in its dry form and sugar syrup have been used prior to the freezing of the mixture, but both of these yield a product which is subject to the disadvantage of stratification. In the past it has been found desirable to make the mixture as dry as possible so as to curb the tendency to form the clear liquid from the mixture. For this reason the use of dry sugar in the form of powder or crystals has been considered superior to the syrup, because the additional mixture in the syrup contributed even more to the formation of the lighter liquid separate from the remainder of the product.

It is an object of this invention to provide a frozen egg mixture which will be free from the disadvantage above enumerated and which is uniform in consistency, structure and color. It is desired to provide an egg product which will flow smoothly and evenly without any tendency to form lumps, and which will retain its moisture as long as possible even when mixed or processed in foodstuffs. A further object is to discover a method by which the above results may be accomplished without the addition of undesirable ingredients in the egg product.

My improved process consists broadly in separating the eggs from their shells, mixing the egg mass with a quantity of maple sap syrup, and then freezing the mixture. I prefer to treat the yolks and whites of the eggs together in a single mixture, though they may be treated separately in the same way if so desired.

As the maple sap syrup is a critical ingredient of the improved product, this will be described in detail.

The maple sap syrup is made from evaporating the sap from the maple tree. When extracted from the tree, the sap is approximately 95% moisture and 5% of a combination of elements comprising a natural sugar, minerals and certain vegetable acids. Just what chemical processes take place within the maple tree to yield a sap of this peculiar nature are not well understood, but the syrups and sugars obtained from this sap have been used in the United States since pioneer days.

In making maple sap syrup, the sap of the maple tree is boiled and deprived of a percentage of its moisture. When the moisture has been evaporated off until the syrup shows a hydrometer reading of 35.5° to 36° Baumé, which will be reached at a temperature of about 219° F., the syrup is removed from the evaporator. This syrup is known as "maple sap syrup." The temperature and density above given are not critical, but are given here only to indicate the stage in the evaporation at which the maple sap is commonly known as maple sap syrup.

If the sap of the maple tree is boiled longer and given a greater density, it will yield a quite different product. For example, at a temperature of about 235° F., the result upon cooling will be a soft sugar, and if brought to a temperature of about 245° F., a hard sugar will result.

Another type of maple syrup may be made by converting the maple sugars again into a liquid or syrup state. This is done by again heating the maple sugar and adding the necessary moisture. This type of maple syrup must be distinguished from maple sap syrup. In maple sap syrup the stage of solidification or crystallization has not been reached, while in the type just described the maple product has been crystallized and then returned to the syrup state.

I have found that when maple sap syrup is mixed with eggs and frozen the resulting product does not tend to stratify after being thawed out, and has a very uniform consistency throughout its mass. Furthermore, when used in mayonnaise or other food mixtures, there is no tendency to separate into two parts as explained in connection with the use of sugar in the egg product. Also, when the improved mixture is used in baked foods as cakes or cookies, these foods will stay moist much longer and will not dry out as do cakes, etc. prepared with the ordinary egg mixture. The improved mixture flows freely and evenly, and remains in liquid form without the tendency to form lumps. Also, the color of the mixture is uniform throughout its mass.

This surprising result appears to be due to the maple sap syrup ingredient added to the eggs before freezing. I have found that the use of maple sugar for mixing with the eggs before freezing does not produce a satisfactory product, and that when maple sugar is used the same type of disadvantages follow as when ordinary sugar or sugar syrup is used. Also, I have found that the use of maple syrup made from maple sugar is unsatisfactory and results in these same disadvantages. Only the use of maple sap syrup, which has never been crystallized, is found to be satisfactory and to enable the improved product of this invention.

It appears that crystallization to form a sugar deprives the syrup of the qualities necessary to produce a smooth uniform mixture which will not stratify. This may be due to the fact that once crystallization has taken place crystal nuclei are formed which do not entirely vanish when the sugar is again changed into a syrup, and so the maple product has been deprived of its resistance to crystalline form. Probably a very important factor in this connection is that upon crystallization certain components of the maple sap syrup are made to separate out of the compound and dispose themselves outside the crystals, and that upon dissolution of the crystals these components never again come into the same chemical relation in the compound. It is known that maple sap syrup contains several vegetable acids, and the taking out of one or more of these acids through crystallization may be what deprives the maple product of its inhibition to crystallization and to the forming of solid matter and lumps.

The maple sap syrup acts in the nature of an emulsifying agent to hold the egg product in a uniform mass, but after being crystallized in the form of sugar this quality is destroyed. In the improved egg product I have made use of this desirable quality of the syrup by using the maple sap syrup instead of the sugars and sugar syrups previously used and in which this quality is absent.

In practicing the new method, I prefer to use maple sap syrup equal to about 7½% by weight of the entire batch, though this proportion may be varied through rather wide limits. As high as 15% by weight of the maple sap syrup has been found to be satisfactory, and even higher percentages may be used. Also, maple sap syrup of various densities may be used. The standard sap syrup before referred to, which has been boiled to a density of 36° Baumé, weighs about 11 pounds per gallon, but syrups of lighter density may be used when so desired.

Any suitable method of freezing the mixture may be employed. In the practice I now follow, the eggs after separation from the shells are mixed with warm maple sap syrup in the mixing vat, and the mass sealed in small cans. The cans are stored in a cooling chamber for several weeks to bring about a thorough freezing of the entire mass within the cans. In the old practice where dry sugar was used, about four weeks were required to freeze the egg mixture, but in the present practice where maple sap syrup is used, only about two weeks are required to give a satisfactory frozen mass.

Maple sap syrup, according to government analysis, has the following characteristics and constituents:

| | |
|---|---|
| Color | 8.2 |
| Sucrose | 95.12 |
| Invert sugar | 1.48 |
| Ash | .87 |
| Insoluble ash | .31 |
| Lead number | 2.30 |
| Mallic acid value | .86 |

The above analysis contrasts with maple sugar syrup, the analysis of which is as folllows:

| | |
|---|---|
| Color | 9.7 |
| Sucrose | 93.95 |
| Invert sugar | 2.56 |
| Ash | .81 |
| Insoluble ash | .24 |
| Lead number | 2.11 |
| Mallic acid value | .65 |

Maple sap syrup because of its difference in ingredients or constituents, behaves quite differently from maple sugar syrup. In the mixing operation, the maple sap syrup apparently forms minute or tiny balls which become attached to the surface of the egg body and remain in uniform suspension throughout the mass no matter how long the mixture is allowed to stand. In the case of maple sugar syrup, the sugar syrup does not remain in suspension, but tends to form a deposit of sugar crystals in the bottom of the container. The same is true of any other crystallized sugar syrup. At the same time, I have found that heavy syrup, such as corn syrup, does not separate in the beating or mixing operation to form tiny globules or droplets, but instead remains in rather stringy or cohesive mass. I find this likewise true of cane syrups. The only syrup which gives the above described new characteristics or results is maple sap syrup which apparently is thin enough to break up and form the tiny droplets or balls which because of their constituents or ingredients tend to remain in separate form and permeate uniformly the egg mass, thereby converting the egg mass into a liquid flowing mass instead of a mass containing lumps of solid bodies as would be otherwise the case if maple sap syrup were not used.

Maple sap syrup is further analyzed as follows:

| | |
|---|---|
| Potash | 38.7 |
| Lime | 21.88 |
| Phosphoric acid | 5.39 |
| Sulphates | 1.59 |
| Sucrose | 62.64 |
| Invert sugar | 1.47 |
| Moisture | 35.00 |

Maple sap syrup contains carbohydrates including fiber amounting to 71.4%, while maple sugar syrup contains carbohydrates including fiber of 82.8%. The fuel value per pound of maple sap syrup is 13.30, while the fuel value per pound of maple sugar syrup is 15.40.

The invention, as has been described, is used not only in canning and freezing the egg yolks but also whole egg mixtures. It may, if desired, be used also with the egg whites.

The foregoing detailed description has been given for clearness of understanding only, and no unnecessary limitations should be understood therefrom, but the appended claims should be construed as broadly as permissible, in view of the prior art.

I claim:

1. A method of treating eggs for the purposes set forth comprising: mixing 5 to 15% of maple sap syrup with an egg mass, and freezing this mixture.

2. A method of treating eggs for the purposes set forth comprising: mixing a quantity of maple sap syrup with an egg mass, and freezing this mixture.

3. In a process for preserving eggs after they have been removed from their shells and in which the egg mass is mixed and frozen, the step of mixing into the egg mass prior to freezing a quantity of maple sap syrup whereby said egg mass after thawing is rendered substantially uniform and consistent throughout.

4. In a process of the character set forth in which an egg mass is mixed and frozen, the step of mixing into said egg mass prior to freezing a maple sap syrup, never having been heated above 219° F.

5. A product comprising a frozen egg mass impregnated with maple sap syrup.

HARRY TEICHNER.